United States Patent
Imai

(10) Patent No.: US 8,238,222 B2
(45) Date of Patent: Aug. 7, 2012

(54) OPTICAL DISK DEVICE

(75) Inventor: Takeshi Imai, Fujisawa (JP)

(73) Assignee: Hitachi-LG Data Storage, Inc., Tokyo (JP)

(*) Notice: Subject to any disclaimer, the term of this patent is extended or adjusted under 35 U.S.C. 154(b) by 0 days.

(21) Appl. No.: 12/955,316

(22) Filed: Nov. 29, 2010

(65) Prior Publication Data

US 2011/0128839 A1 Jun. 2, 2011

(30) Foreign Application Priority Data

Nov. 30, 2009 (JP) .................................. 2009-272815

(51) Int. Cl.
G11B 7/00 (2006.01)
G11B 5/58 (2006.01)
G11B 11/00 (2006.01)

(52) U.S. Cl. .................. 369/112.23; 369/94; 369/53.22; 369/53.35

(58) Field of Classification Search ............. 369/112.23, 369/44.41, 53.22, 53.35, 59.17, 124.12, 283, 369/94, 112.08, 112.13
See application file for complete search history.

(56) References Cited

U.S. PATENT DOCUMENTS

| | | | |
|---|---|---|---|
| 5,831,953 A | 11/1998 | Numata | |
| 6,034,934 A * | 3/2000 | Miyake et al. | 369/53.28 |
| 2001/0024408 A1* | 9/2001 | Kobayashi | 369/44.27 |
| 2005/0135216 A1* | 6/2005 | Chang et al. | 369/53.25 |
| 2007/0171781 A1* | 7/2007 | Imai et al. | 369/44.27 |
| 2008/0117783 A1* | 5/2008 | Imai | 369/53.23 |
| 2008/0192591 A1* | 8/2008 | Park et al. | 369/44.32 |

FOREIGN PATENT DOCUMENTS

| | | |
|---|---|---|
| JP | 09-147369 | 6/1997 |
| JP | 2006-277846 | 10/2006 |
| JP | 2007-004903 | 1/2007 |
| JP | 2007-026557 | 2/2007 |
| JP | 2007-095169 | 4/2007 |

* cited by examiner

Primary Examiner — Joseph Feild
Assistant Examiner — Aneeta Yodichkas
(74) Attorney, Agent, or Firm — McDermott Will & Emery LLP

(57) ABSTRACT

Proposed is an optical disk device capable of appropriately performing focus control. In an optical disk device, an objective lens is moved in the thickness direction of an optical disk by controlling an actuator and a time interval in which each of the recording layers was detected is measured while moving the objective lens, a first time interval from the first detection of the recording layer to the second detection of the recording layer is compared with a second time interval from the second detection of the recording layer to the third detection of the recording layer, and a focal position of the objective lens is determined based on the comparative result.

4 Claims, 11 Drawing Sheets

OPTICAL DISK DEVICE

CROSS REFERENCES

This application relates to and claims priority from Japanese Patent Application No. 2009-272815, filed on Nov. 30, 2009, the entire disclosure of which is incorporated herein by reference.

BACKGROUND

The present invention relates to an optical disk device and, for example, can be suitably applied to an optical disk device capable of reproducing a multilayered optical disk.

Conventionally, with optical disks such as DVDs (digital versatile discs) and BDs (Blu-ray Discs), multi-layering of the recording layer has been proposed as means for increasing the recording capacity, and an optical disk with two recording layers has been put into practical use. In order to achieve even greater capacity, it is anticipated that a multilayered optical disk with three or even four or more recording layers will be put into practical use.

As a method of detecting the recording layers in this kind of multilayered optical disk, proposed is a method of using a phenomenon of the amplitude of a focus error signal fluctuating in an S-shape in the vicinity of the recording layer and moving the focal position of the optical beam emitted from the laser diode of the optical disk device in a thickness direction of the multilayered optical disk, and detecting the number of recording layers or the target recording layer based on the number of S-shaped amplitudes (hereinafter referred to as the "S-curve amplitudes") that are generated in the focus error signal at such time (for example, refer to Japanese Unexamined Patent Application Publication No. 2007-26557).

SUMMARY

Nevertheless, with an optical disk device applying the foregoing technology, upon performing focus control to the multilayered optical disk, there were cases where the S-curve amplitude of the focus error signal generated on the disk surface was erroneously detected as the S-curve amplitude generated on the recording layer, and, as a result of erroneously counting such disk surface as a recording layer, focus control was performed so as to focus on a recording layer that is one before the intended recording layer.

The present invention was devised in view of the foregoing points. Thus, an object of this invention is to propose an optical disk device capable of performing focus control with accuracy.

In order to achieve the foregoing object, the present invention provides an optical disk device capable of reproducing an optical disk having three or more recording layers. This optical disk device comprises a laser diode for emitting a laser beam, a photodiode for receiving reflected light of the laser beam in the optical disk, and outputting the received reflected light upon performing photoelectric conversion thereto, an optical system including an objective lens and which collects the laser beam emitted from the laser diode on the recording layer of the optical disk via the objective lens, and guides the reflected light in the optical disk to the photodiode via the objective lens, a signal processing unit for creating a focus error signal based on an output of the photodiode, a processor for detecting the recording layer based on the focus error signal created with the signal processing unit, and an actuator for moving the objective lens of the optical system in a thickness direction of the optical disk. The processor moves the objective lens in the thickness direction of the optical disk by controlling the actuator, and measures a time interval in which each of the recording layers was detected while moving the objective lens, compares a first time interval from the first detection of the recording layer to the second detection of the recording layer, and a second time interval from the second detection of the recording layer to the third detection of the recording layer, and determines a focal position of the objective lens based on a comparative result.

Moreover, the present invention additionally provides an optical disk device capable of reproducing an optical disk having three or more recording layers. This optical disk device comprises a laser diode for emitting a laser beam, a photodiode for receiving reflected light of the laser beam in the optical disk, and outputting the received reflected light upon performing photoelectric conversion thereto, an optical system including an objective lens and which collects the laser beam emitted from the laser diode on the recording layer of the optical disk via the objective lens, and guides the reflected light in the optical disk to the photodiode via the objective lens, a signal processing unit for creating a focus error signal based on an output of the photodiode, a processor for detecting the recording layer based on the focus error signal created with the signal processing unit, and an actuator for moving the objective lens of the optical system in a thickness direction of the optical disk. The processor moves the objective lens in the thickness direction of the optical disk by controlling the actuator, and measures the respective drive voltages of the actuator when each of the recording layers was detected while moving the objective lens, compares a first potential difference between the drive voltage upon the first detection of the recording layer and the drive voltage upon the second detection of the recording layer, and a second potential difference between the drive voltage upon the second detection of the recording layer and the drive voltage upon the third detection of the recording layer, and determines a focal position of the objective lens based on a comparative result.

According to the present invention, it is possible to realize an optical disk device capable of performing appropriate focus control.

DETAILED DESCRIPTION

An embodiment of the present invention is now explained in detail with reference to the attached drawings.

Figure 1:
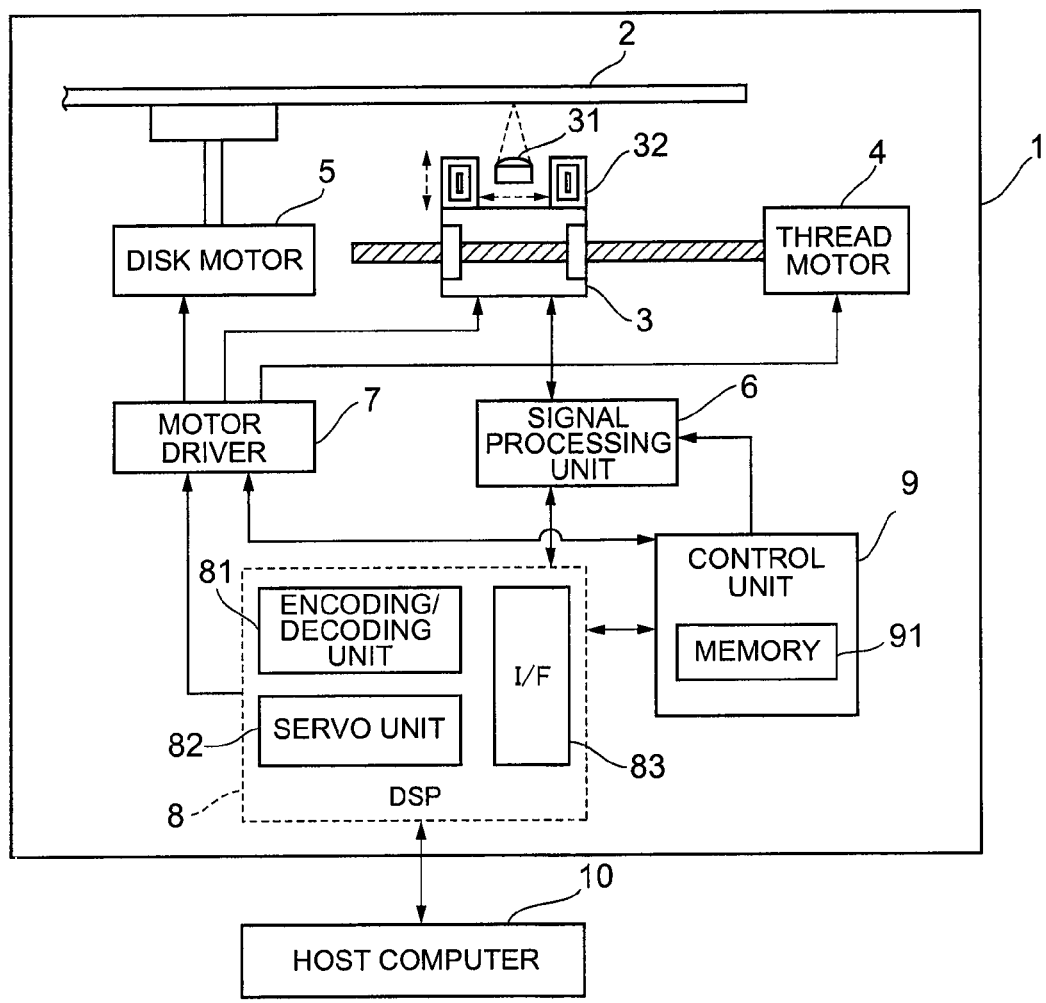
FIG. 1 is a block diagram showing the optical disk device according to an embodiment of the present invention.

(1) First Embodiment (1-1) Configuration of Optical Disk Device in Present Embodiment FIG. 1 shows the overall optical disk device 1 according to this embodiment. The optical disk device 1 comprises an optical pickup 3, a thread motor 4, a disk motor 5, a signal processing unit 6, a motor driver 7, a DSP (Digital Signal Processor) 8, and a control unit 9.

Figure 2:
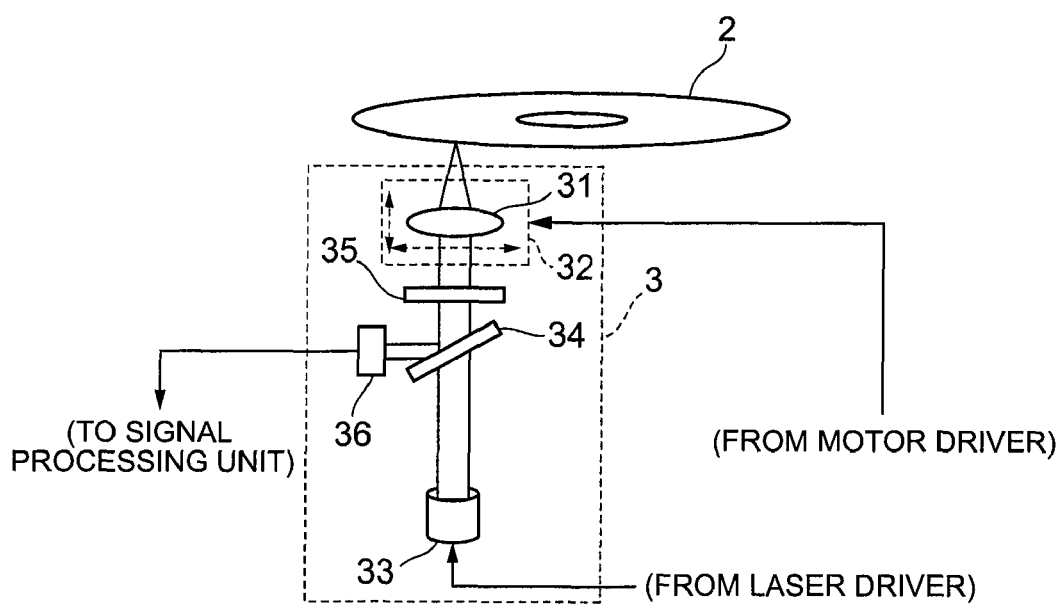
FIG. 2 is a block diagram showing a schematic configuration of the optical pickup.

The optical pickup 3 comprises, as shown in FIG. 2, an objective lens 31, an actuator 32, a laser diode 33, a polarizing beam splitter 34, a quarter wavelength plate 35, and a photodiode 36.

The actuator 32 tilts the objective lens 31 in the radial direction of the multilayered optical disk 2 or moves the objective lens 31 in the thickness direction of the multilayered optical disk 2 based on the drive voltage supplied to the motor driver 7 described later. Moreover, the laser diode 33 emits a laser beam with emission power according to the drive voltage that is supplied from the signal processing unit 6.

The polarizing beam splitter 34 causes the laser beam from the laser diode 33 to be transmitted, and the quarter wavelength plate 35 changes the polarizing direction by shifting the phase of the laser beam from the polarizing beam splitter 34 π/2. The objective lens 31 collects the laser beams from the quarter wavelength plate 35 on the recording layers of the multilayered optical disk 2, and converts the laser beams that were reflected on the recording layers of the multilayered optical disk 2 into parallel light. The reflected light of the laser beam in the multilayered optical disk 2 retains information written into the recording layers of the multilayered optical disk 2 as the change in light intensity.

The quarter wavelength plate 35 changes the polarizing direction of the reflected light that enters via the objective lens 31, and the polarizing beam splitter 34 reflects the reflected light that enters via the quarter wavelength plate 35 and guides it to the light receiving surface of the photodiode 36.

The photodiode 36 is configured, for example, from a four-quadrant photodiode, performs photoelectric conversion to the reflected light that enters via the polarizing beam splitter 34, and outputs the thus obtained electric signal to the signal processing unit 6.

The thread motor 4 moves the optical pickup 3 in the radial direction on the multilayered optical disk 2 according to the drive voltage supplied from the motor driver 7.

The disk motor 5 rotatively drives the multilayered optical disk 2 mounted on the optical disk device 1 according to the drive voltage supplied from the motor driver 7.

The motor driver 7 supplies a drive voltage to the thread motor 4, the disk motor 5, and the actuator 32 for driving the same.

The signal processing unit 6 creates a recording signal to be supplied to the optical pickup 3, creates a focus error signal, a tracking error signal and an RF signal based on the electric signal supplied from the optical pickup 3, sends the created focus error signal, tracking error signal and RF signal to the DSP 8, and sends the focus error signal to the control unit 9. Moreover, the signal processing unit 6 creates a drive signal of the laser diode 33 based on the encoded recorded data supplied from the DSP 8 described later, and drives the laser diode 33 of the optical pickup 3 based on the foregoing drive signal.

The DSP 8 comprises an encoding/decoding unit 81, a servo unit 82, and an interface 83. Among the above, the encoding/decoding unit 81 decodes the RF signal that is supplied from the signal processing unit 6. Moreover, the DSP 8 encodes the recorded data supplied from the host computer 10, and supplies the thus obtained encoded recorded data to the signal processing unit 6.

Moreover, the servo unit 82 creates a servo signal to be used for focusing and tracking based on the focus error signal and tracking error signal supplied from the signal processing unit 6, and supplies the created servo signal to the motor driver 7. Consequently, focus control and tracking control are performed as a result of the actuator 32 of the optical pickup 3 or the thread motor 4 being driven with the motor driver 7 based on the foregoing servo signal. In addition, the interface 83 performs protocol conversion for transferring recording/reproduction data and commands to and from an externally connected host computer 10.

The control unit 9 is a processor that governs the operational control of the overall optical disk device 1, and, by controlling the signal processing unit 6, the motor driver 7, the DSP 8 and the like based on the various control programs and various control data stored in the memory 91, causes them to read and write data to and from the mounted multilayered optical disk 2 according to requests from the host computer 10.

(1-2) Outline of Operation of Optical Disk Device in First Embodiment

Outline of the operation of the optical disk device 1 is now explained with reference to FIG. 3 to FIG. 5.

Figure 3A:
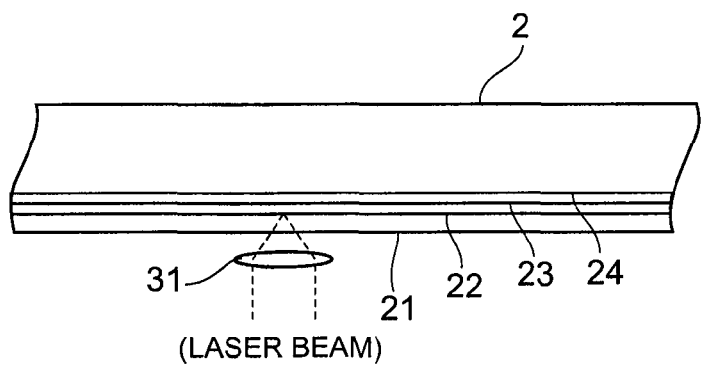
FIG. 3A and FIG. 3B are schematic diagrams explaining the principle of the present invention.
Figure 3B:
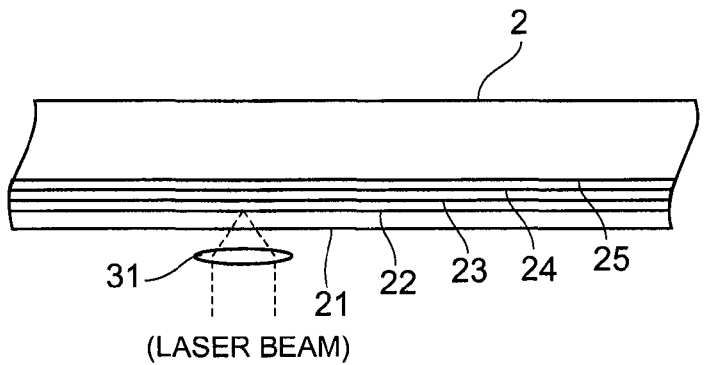

Note that, in the ensuing explanation, let it be assumed that the multilayered optical disk 2 is a three-layer BD as shown in FIG. 3A comprising a surface 21, a first recording layer 22 (layer 2), a second recording layer 23 (layer 1), and a third recording layer 24 (layer 0), or a four-layer BD as shown in FIG. 3B comprising a surface 21, a first recording layer 22 (layer 3), a second recording layer 23 (layer 2), a third recording layer 24 (layer 1), and a fourth recording layer 25 (layer 0).

Upon reading or writing data from or to any one of the recording layers of the multilayered optical disk 2, the optical disk device 1 emits a laser beam to the multilayered optical disk 2 while moving the objective lens 31 from the lower limit position of drive to the upper limit position of drive at a constant speed, and detects, as the S-curve amplitude of the recording layer, an S-curve amplitude in which the positive amplitude of the focus error signal is greater than a first threshold and the negative amplitude is not greater than a second threshold based on the obtained focus error signal.

Subsequently, the optical disk device 1 measures a time interval T0 from the detection of the first S-curve amplitude to the detection of the second S-curve amplitude, measures a time interval T1 from the detection of the second S-curve amplitude to the detection of the third S-curve amplitude, and compares the measured two time intervals T0, T1.

Figure 4:
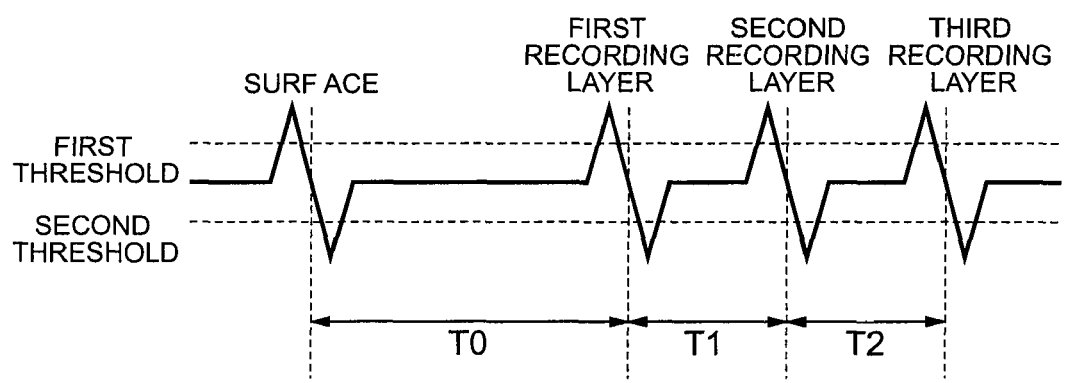
FIG. 4 is a waveform diagram explaining the operation of the optical disk device upon erroneously detecting the surface of the optical disk as a recording layer.

In the foregoing case, as a result of comparing the two time intervals T0, T1, if time interval T0>>time interval T1 (for example, time interval T0>time interval T1×2) as shown in FIG. 4, the optical disk device 1 determines that the surface 21 was erroneously detected as a recording layer.

This is because, with a multilayered optical disk of the BD standard, the distance from the surface 21 to the first recording layer 22 is more than double the distance from the first recording layer 22 to the second recording layer 23 (distance from the second recording layer 23 to the third recording layer 24), and the time interval from the time that the focal point of the laser beam passes through the surface 21 and then passes through the first recording layer 22 is more than double the time interval from the time that the focal point of the laser beam passes through the first recording layer 22 and then passes through the second recording layer 23. If the surface 21 is erroneously detected as a recording layer, since the surface 21 is counted as a recording layer, the focal position of the objective lens 13 should be positioned on the second recording layer 23, which is one layer before the third recording layer 24.

Thus, if time interval T0>>time interval T1 as a result of comparing the time interval T0 and the time interval T1, the optical disk device 1 sets the focal position (performs focus lock-in) of the objective lens 31 to the recording layer (second recording layer 23 in this case) in which the S-curve amplitude of the focus error was detected third in the multilayered optical disk 2, and thereafter moves the focal position (jumps the focus of) the objective lens 31 from that recording layer to the intended recording layer (this recording layer is hereinafter referred to as the "target layer").

Figure 5:
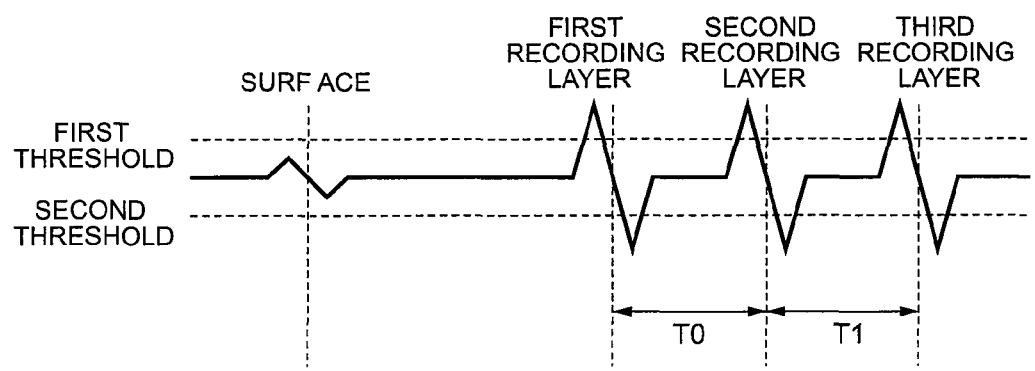
FIG. 5 is a waveform diagram explaining the operation of the optical disk device upon correctly detecting a recording layer of the optical disk.

Meanwhile, if time interval T0≈time interval T1 (for example, time interval T0<time interval T1×2) as a result of comparing the time intervals T0, T1 as shown in FIG. 5, the optical disk device 1 determines that the recording layer has been detected accurately.

This is because, with a multilayered optical disk of the BD standard, the distance from the first recording layer 22 to the second recording layer 23 is approximately equal to the distance from the second recording layer 23 to the third recording layer 24, and the time required for the focal point of the laser beam to pass through the first recording layer 22 and then pass through the second recording layer 23 is approximately equal to the time that is required for the focal point of the laser beam to pass through the second recording layer 23 and then pass through the third recording layer 24.

Thus, if time interval T0≈time interval T1 as a result of comparing the time interval T0 and the time interval T1, the optical disk device 1 performs focus lock-in to the recording layer (third recording layer 24 in this case) in which the S-curve amplitude of the focus error signal was detected third in the multilayered optical disk 2, and thereafter jumps the focus from that recording layer to the target layer.

Consequently, the optical disk device 1 is able to accurately move the focal position of the objective lens to the target layer of the multilayered optical disk 2 with three or more recording layers by measuring the time interval T0 from the first detection of the S-curve amplitude to the second detection of the S-curve amplitude and the time interval T1 from the second detection of the S-curve amplitude to the third detection of the S-curve amplitude, and determining whether the surface 21 was erroneously detected as a recording layer based on the comparative result of the measured two time intervals.

(1-3) Specific Processing of Optical Disk Device

Figure 6:
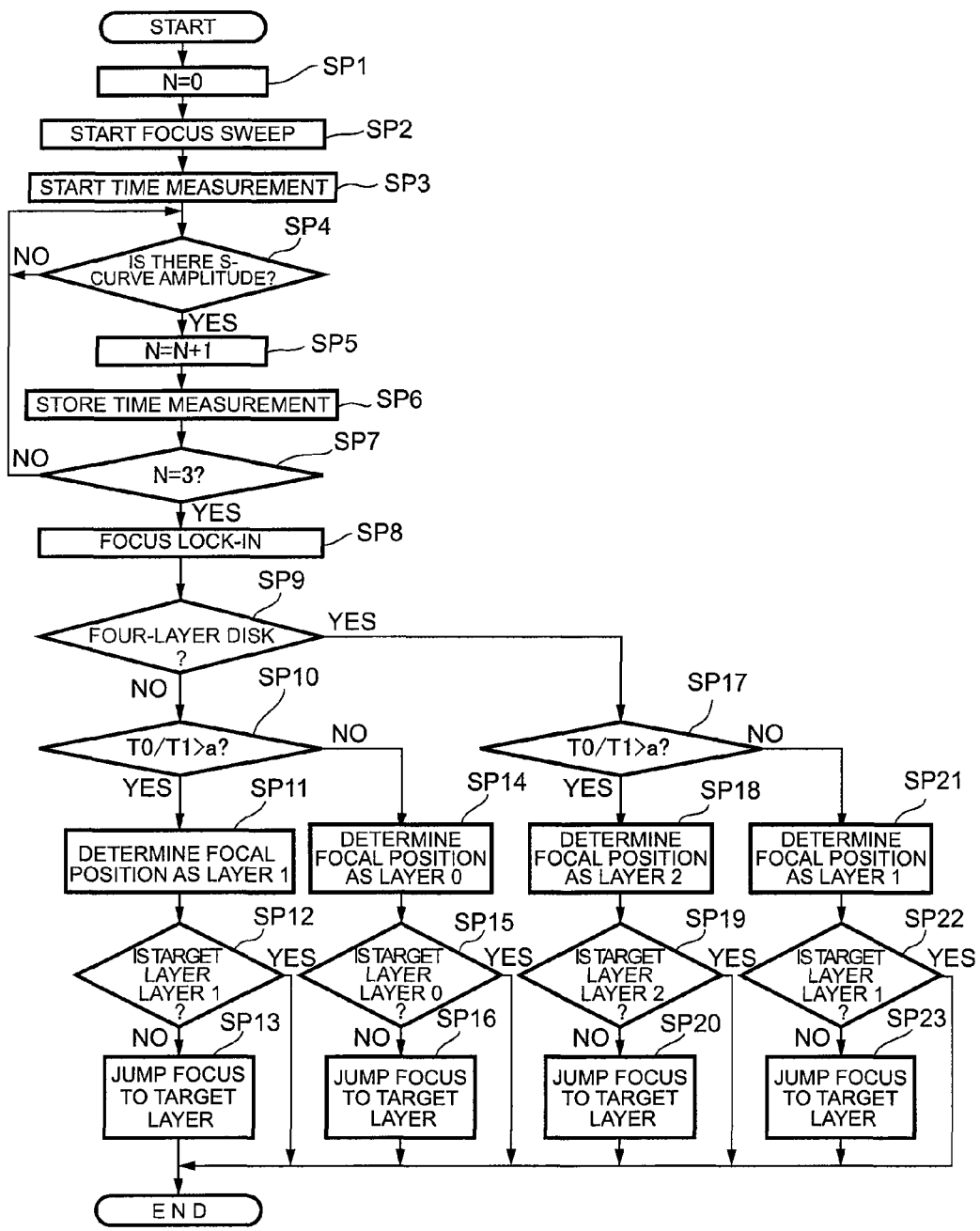
FIG. 6 is a flowchart showing the processing routine of the focus control processing according to the first embodiment.

Here, the focus control processing to be executed by the control unit 9 upon the optical disk device 1 moving the focal position of the objective lens to the target layer of the three-layer or four-layer multilayered optical disk 2 is now explained with reference to FIG. 6.

Foremost, when the control unit 9 receives a command from the host computer 10 to move the focal position of the objective lens 31 to a specific recording layer (target layer), the control unit 9 starts the focus control processing shown in FIG. 6, and initializes the count value of the counter not shown for counting the S-curve amplitudes (hereinafter referred to as the "S-curve amplitude counter") to "0" (SP1).

Subsequently, the control unit 9 moves the objective lens from the lower limit of drive to the upper limit of drive at a constant speed by controlling the actuator 32 of the optical pickup 3 via the motor driver 7. Thereby started is a focus sweep in which the focal position of the objective lens 31 of the laser beam emitted from the laser diode 33 is moves from the surface side to the label side of the multilayered optical disk 2 (SP2). Moreover, the control unit 9 starts measuring the time interval between the generation timings of the S-curve amplitudes based on the focus error signal supplied from the signal processing unit 6 (SP3).

The control unit 9 thereafter waits for an S-curve amplitude to be generated in the focus error signal (SP4), and, upon eventually detecting the S-curve amplitude, increases the count value of the S-curve amplitude counter by "1" (SP5). Moreover, the control unit 9 stores the time interval from the previous detection of the S-curve amplitude of the focus error signal to the current detection of the S-curve amplitude of the focus error signal in the memory 91 (SP6). However, at the stage that the S-curve amplitude of the focus error signal was detected first, since the foregoing time interval cannot be obtained, the processing of storing the time interval in the memory 91 is not performed in the foregoing case.

Subsequently, the control unit 9 determines whether the count value of the S-curve amplitude counter has reached "3" (SP7). The control unit 9 returns to step SP4 upon obtaining a negative result in this determination, and thereafter repeats the loop of step SP4 to step SP7-step SP4 until a positive result is obtained at step SP7.

When the control unit 9 eventually obtains a positive result at step SP7 as a result of detecting the third S-curve amplitude of the focus error signal after starting the focus sweep at step SP2, the control unit 9 stops the focus sweep by controlling the actuator 32 of the optical pickup 3 via the motor driver 7. Moreover, the control unit 9 thereafter performs focus lock-in to the recording layer corresponding to the S-curve amplitude of the focus error signal that was detected third in the multi-layered optical disk 2 by controlling the actuator 32 of the optical pickup 3 via the motor driver 7 (SP8).

Subsequently, the control unit 9 determines whether the target multilayered optical disk 2 is a four-layer optical disk (SP9). Specifically, since the control unit 9 has previously acquired information regarding the number of layers of an optical disk in the disk discrimination processing to be executed after that optical disk is mounted on the optical disk device 1, the control unit 9 performs the determination at step SP9 based on the foregoing information.

If the control unit 9 obtains a negative result in the foregoing determination, the control unit 9 determines whether the numerical value obtained by dividing the time interval T0, which is the time interval from the detection of the first S-curve amplitude to the detection of the second S-curve amplitude regarding the focus error signal, by the time interval T1, which is the time interval from the detection of the second S-curve amplitude to the detection of the third S-curve amplitude regarding the focus error signal, is greater than a predetermined threshold (hereafter referred to as the "determination threshold") "a" (SP10).

The determination threshold "a" is used for determining whether the first S-curve amplitude detected the surface of the multilayered optical disk 2 as a recording layer. Thus, as the determination threshold "a", a number that is greater than 1 ("2" for example) is used in consideration of the fact that, as described with reference to FIG. 5, with a BD, the distance from the surface 21 to the first recording layer 22 that is closest to the surface 21 is greater than (double) the distance from the first recording layer 22 to the subsequent second recording layer 23. Note that, at step SP10, it is also possible to determine whether the multiplication result obtained by multiplying the foregoing time interval T1 by the determination threshold "a" is greater than the foregoing time interval T0.

To obtain a positive result in the determination at step SP10 means that the surface 21 of the multilayered optical disk 2 was erroneously detected as a recording layer. Consequently, the control unit 9 determines that the current focal position of the objective lens 31 is on the second recording layer 23 (layer 1 of a three-layer disk) (SP11), and thereafter determines whether the target layer is the second recording layer 23 (SP12). The control unit 9 ends the focus control processing upon obtaining a positive result in the foregoing determination.

Moreover, if the control unit 9 obtains a negative result in the determination at step SP12, the control unit 9 moves the focal position of the objective lens 31 to the target layer by controlling the actuator 32 of the optical pickup 3 via the motor driver 7 (SP13), and thereafter ends the focus control processing.

Meanwhile, to obtain a negative result in the determination at step SP10 means that the surface 21 of the multilayered optical disk 2 was not erroneously detected as a recording layer. Consequently, the control unit 9 determines that the current focal position of the objective lens 31 is on the third recording layer 24 (layer 0 of a three-layer disk) (SP14), and determines whether the target layer is the third recording layer 24 (SP15). The control unit 9 ends the focus control processing upon obtaining a positive result in the foregoing determination.

Moreover, if the control unit 9 obtains a negative result in the determination at step SP15, the control unit 9 moves the focal position of the objective lens 31 to the target layer by controlling the actuator 32 of the optical pickup 3 via the motor driver 7 (SP16), and thereafter ends the focus control processing.

Meanwhile, if the control unit 9 obtains a positive result in the determination at step SP9, it determines whether the arithmetic result of dividing the time interval T0 by the time interval T1 is greater than the determination threshold "a" (SP17). Note that, at step SP17, it is also possible to determine whether the multiplication result obtained by multiplying the foregoing time interval T1 by the determination threshold "a" is greater than the foregoing time interval T0.

To obtain a positive result in the foregoing determination means that the surface 21 of the multilayered optical disk 2 was erroneously detected as a recording layer. Consequently, the control unit 9 determines that the current focal position of the objective lens 31 is on the third recording layer 24 (layer 2 of a four-layer disk) (SP18), and determines whether the target layer is the third recording layer 24 (SP19). The control unit 9 ends the focus control processing upon obtaining a positive result in the foregoing determination.

Moreover, if the control unit 9 obtains a negative result in the determination at step SP19, the control unit 9 moves the focal position of the objective lens 31 to the target layer by controlling the actuator 32 of the optical pickup 3 via the motor driver 7 (SP20), and thereafter ends the focus control processing.

Meanwhile, to obtain a negative result in the determination at step SP17 means that the surface 21 of the multilayered optical disk 2 was not erroneously detected as a recording layer. Consequently, the control unit 9 determines that the current focal position of the objective lens 31 is on the third recording layer 24 (layer 1 of a four-layer disk) (SP21), and determines whether the target layer is the third recording layer 24 (SP22). The control unit 9 ends the focus control processing upon obtaining a positive result in the foregoing determination.

Moreover, if the control unit 9 obtains a negative result in the determination at step SP22, the control unit 9 moves the focal position of the objective lens 31 to the target layer by controlling the actuator 32 of the optical pickup 3 via the motor driver 7 (SP23), and thereafter ends the focus control processing.

(1-4) Effect of Present Embodiment

As described above, with the optical disk device 1 according to this embodiment, the focal position of the objective lens can be positioned on the target layer with accuracy since whether the surface 21 of the multilayered optical disk 2 was erroneously detected as a recording layer is determined based on the time intervals of the S-curve amplitudes of the focus error signal which are detected upon performing a focus sweep, and focus control is performed to set the focal position of the objective lens 31 on the target layer based on the foregoing determination result.

(2) Second Embodiment

In the first embodiment, focus lock-in was performed to the recording layer in which the third S-curve amplitude of the focus error signal was detected, and the focus was thereafter jumped to the target layer as needed. However, with the focus control processing according to this embodiment, the focal position of the objective lens 31 is determined without performing focus lock-in to the recording layer in which the third S-curve amplitude of the focus error signal was detected, and focus lock-in is performed directly to the target layer.

The foregoing focus control processing is now explained with reference to FIG. 7 to FIG. 9. However, in this embodiment, the multilayered optical disk 2 to be subject to the focus control processing is a three-layer or four-layer multilayered optical disk explained with reference to FIG. 3.

Figure 7:
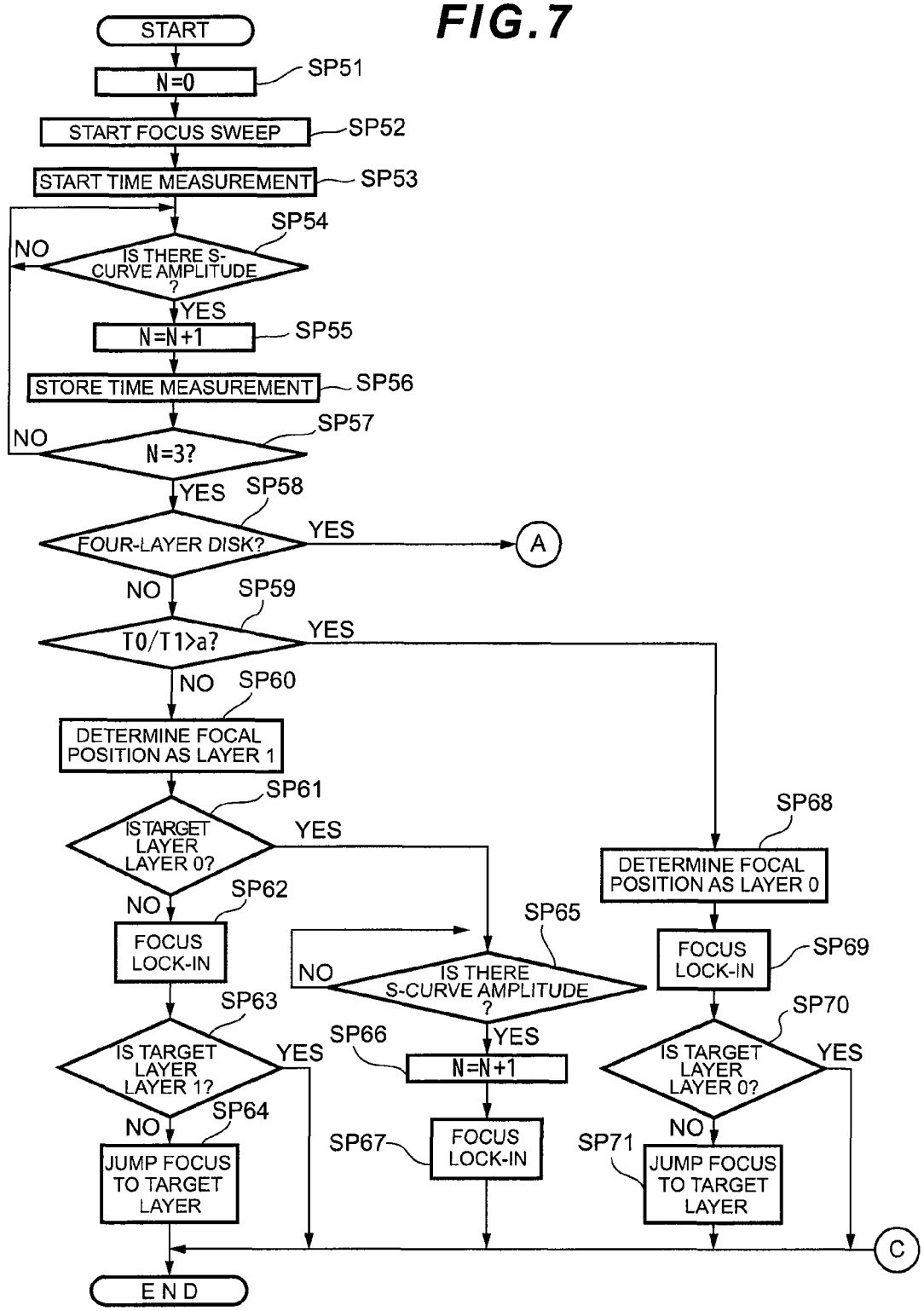
FIG. 7 is a flowchart showing the processing routine of the focus control processing according to the second embodiment.
Figure 8:
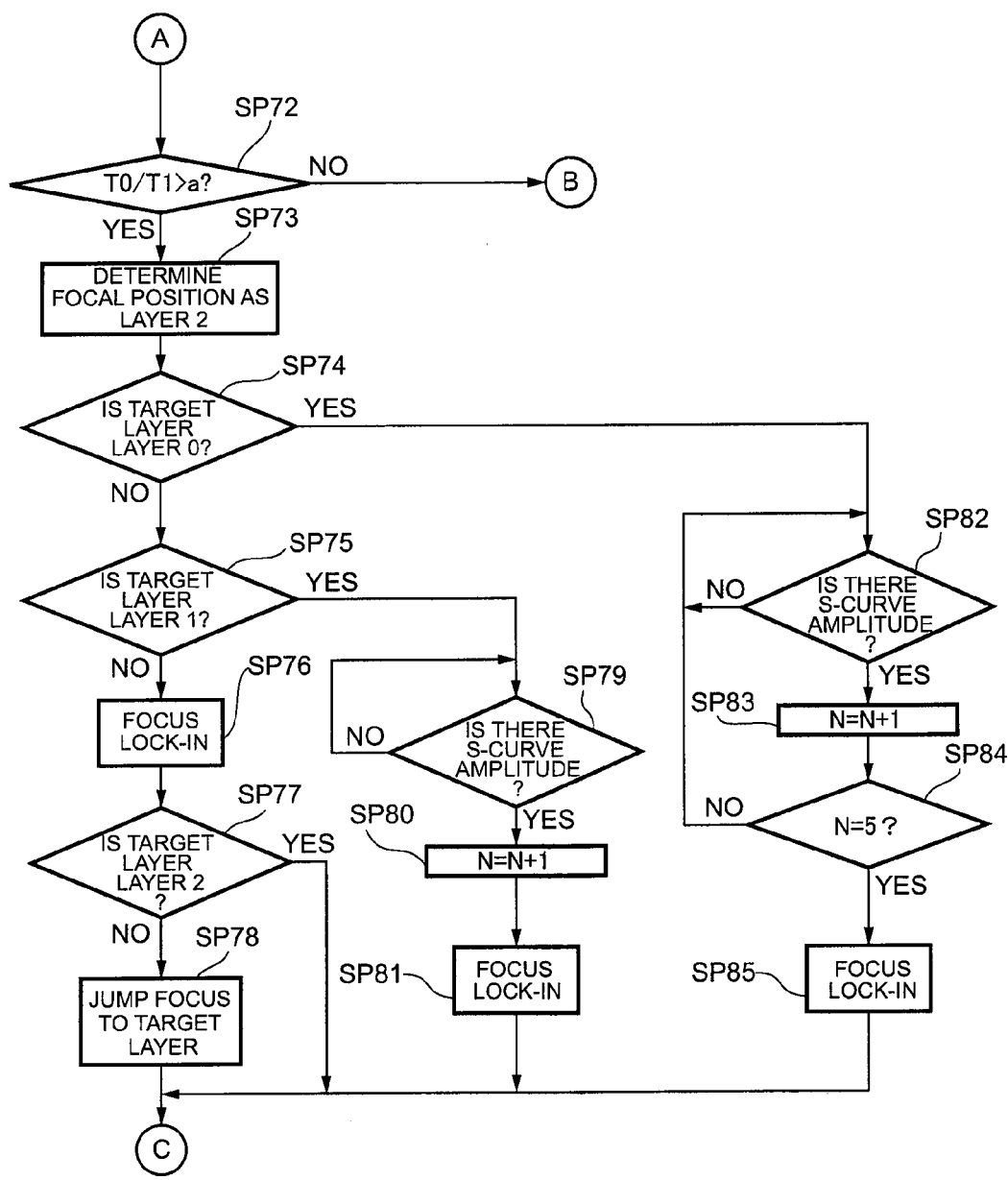
FIG. 8 is a flowchart showing the processing routine of the focus control processing according to the second embodiment.
Figure 9:
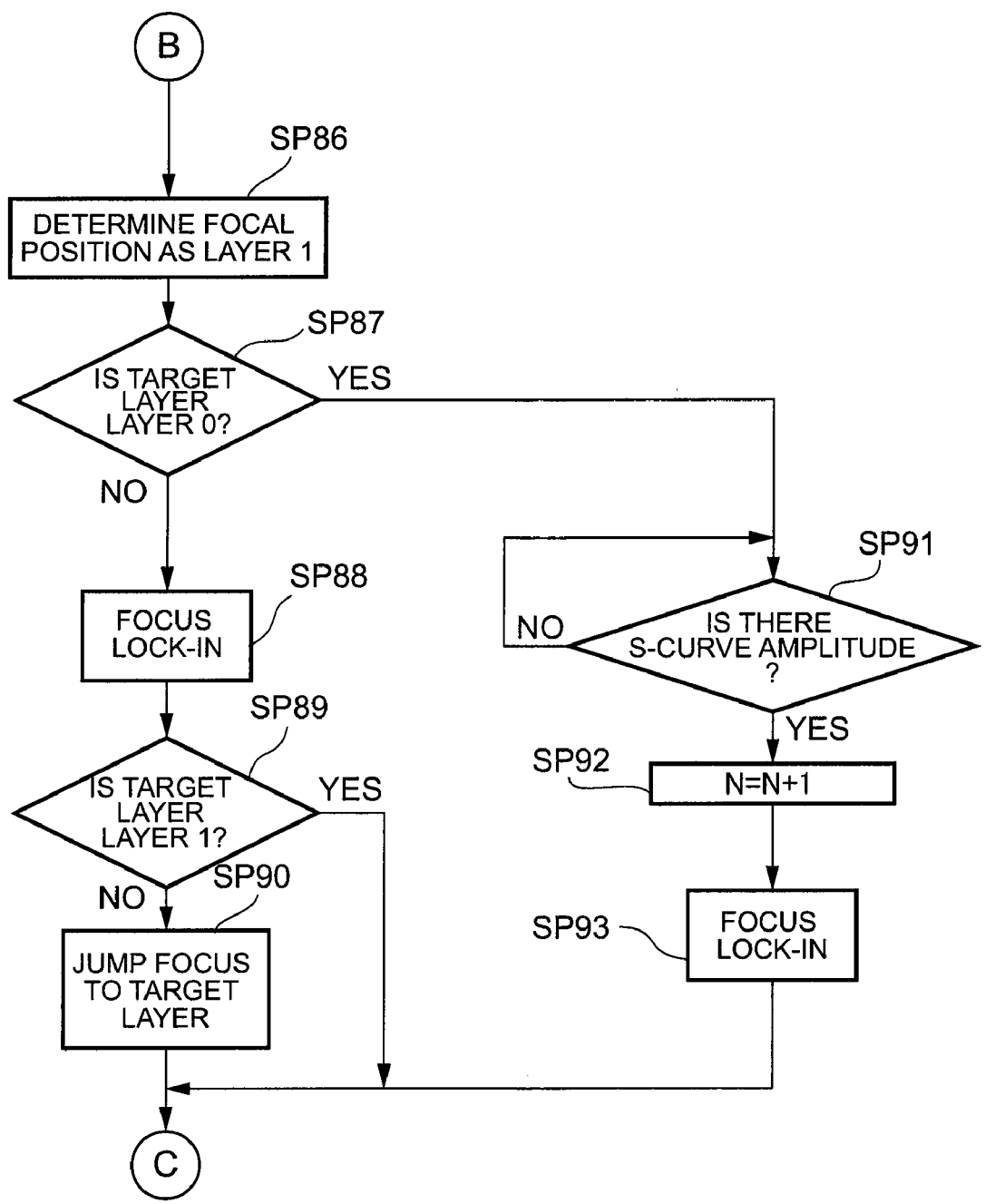
FIG. 9 is a flowchart showing the processing routine of the focus control processing according to the second embodiment.

Foremost, when the control unit 9 receives a command from the host computer 10 to move the focal position of the objective lens 31 to a specific recording layer (target layer), the control unit 9 starts the focus control processing shown in FIG. 7 to FIG. 9, and initializes the count value of the S-curve amplitude counter to "0" (SP51).

Subsequently, the control unit 9 starts the focus sweep by controlling the actuator 32 of the optical pickup 3 via the motor driver 7 (SP52), and starts measuring the time interval between the generation timings of the S-curve amplitudes based on the focus error signal supplied from the signal processing unit 6 (SP53).

The control unit 9 thereafter waits for an S-curve amplitude to be generated in the focus error signal (SP54), and, upon eventually detecting the S-curve amplitude, increases the count value of the S-curve amplitude counter by "1" (SP55). Moreover, the control unit 9 stores the time interval from the previous detection of the S-curve amplitude of the focus error signal to the current detection of the S-curve amplitude of the focus error signal in the memory 91 (SP56). However, at the stage that the S-curve amplitude of the focus error signal was detected first, since the foregoing time interval cannot be obtained, the processing of storing the time interval in the memory 91 is not performed in the foregoing case.

Subsequently, the control unit 9 determines whether the count value of the S-curve amplitude counter has reached "3" (SP57). The control unit 9 returns to step SP54 upon obtaining a negative result in this determination, and thereafter repeats the loop of step SP54 to step SP57-step SP54 until a positive result is obtained at step SP57.

When the control unit 9 eventually obtains a positive result at step SP57 as a result of detecting the third S-curve amplitude of the focus error signal after starting the focus sweep at step SP52, the control unit 9 determines whether the multilayered optical disk 2 is a four-layer disk based on the information acquired in the foregoing disk discrimination processing without stopping the focus sweep (SP58).

If the control unit 9 obtains a negative result in the foregoing determination, the control unit 9 determines whether the numerical value obtained by dividing the time interval T0, which is the time interval from the detection of the first S-curve amplitude to the detection of the second S-curve amplitude regarding the focus error signal, by the time interval T1, which is the time interval from the detection of the second S-curve amplitude to the detection of the third S-curve amplitude regarding the focus error signal, is greater than the determination threshold "a" (SP59). Note that, at step SP59, it is also possible to determine whether the multiplication result obtained by multiplying the foregoing time interval T1 by the determination threshold "a" is greater than the foregoing time interval T0.

To obtain a positive result in the determination at step SP59 means that the surface 21 of the multilayered optical disk 2 was erroneously detected as a recording layer. Consequently, the control unit 9 determines that the current focal position of the objective lens 31 is on the second recording layer 23 (layer 1 of a three-layer disk) (SP60), and thereafter determines whether the target layer is the third recording layer 24 (layer 0 of a three-layer disk) (SP61).

If the control unit 9 obtains a negative result in the foregoing determination, the control unit 9 performs focus lock-in to the recording layer (layer 1 of a three-layer disk in this case) to which the current focal point of the objective lens 31 is positioned (SP62), and thereafter determines whether the target layer is the second recording layer 23 (layer 1 of a three-layer disk) (SP63). The control unit 9 ends the focus control processing upon obtaining a positive result in the foregoing determination.

Moreover, if the control unit 9 obtains a negative result in the determination at step SP63, the control unit 9 moves the focal position of the objective lens 31 to the target layer by controlling the actuator 32 of the optical pickup 3 via the motor driver 7 (SP64), and thereafter ends the focus control processing.

Meanwhile, if the control unit 9 obtains a positive result in the determination at step SP61, the control unit 9 thereafter waits for an S-curve amplitude to be generated in the focus error signal (SP65). When an S-curve amplitude is eventually generated in the focus error signal, the control unit 9 increases the count value of the S-curve amplitude counter by 1 (SP66), thereafter performs focus lock-in to the recording layer corresponding to the detected S-curve amplitude (SP67), and then ends the focus control processing.

Moreover, if the control unit 9 obtains a negative result in the determination at step SP59, the control unit 9 determines that the current focal position of the objective lens 31 is on the third recording layer 24 (layer 0 of a three-layer disk) (SP68), performs focus lock-in to that recording layer (SP69), and thereafter determines whether the target layer is the third recording layer 24 (layer 0 of a three-layer disk) (SP70). The control unit 9 ends the focus control processing upon obtaining a positive result in the foregoing determination.

In addition, if the control unit 9 obtains a negative result in the determination at step SP70, the control unit 9 moves the focal position of the objective lens 31 to the target layer by controlling the actuator 32 of the optical pickup 3 via the motor driver 7 (SP71), and thereafter ends the focus control processing.

In addition, if the control unit 9 obtains a positive result in the determination at step SP58, it determines whether the numerical value obtained by dividing the time interval T0 by the time interval T1 is greater than the determination threshold "a" (SP72). Note that, at step SP72, it is also possible to determine whether the multiplication result obtained by multiplying the foregoing time interval T1 by the determination threshold "a" is greater than the foregoing time interval T0.

To obtain a positive result in the foregoing determination means that the surface 21 of the multilayered optical disk 2 was erroneously detected as a recording layer. Consequently, the control unit 9 determines that the current focal position of the objective lens 31 is on the second recording layer 23 (layer 2 of a four-layer disk) (SP73), and determines whether the target layer is the fourth recording layer 25 (layer 0 of a four-layer disk) (SP74). Moreover, the control unit 9 determines whether the target layer is the third recording layer 24 (layer 1 of a four-layer disk) upon obtaining a negative result in the foregoing determination (SP75).

If the control unit 9 obtains a negative result in the determination at step SP75, the control unit 9 performs focus lock-in to the second recording layer 23 (layer 2 of a four-layer disk) of the multilayered optical disk 2 (SP76), and thereafter determines whether the target layer is the second recording layer 23 (SP77). The control unit 9 ends the focus control processing upon obtaining a positive result in the foregoing determination.

Moreover, if the control unit 9 obtains a negative result in the determination at step SP77, the control unit 9 moves the focal position of the objective lens 31 to the target layer by controlling the actuator 32 of the optical pickup 3 via the motor driver 7 (SP78), and thereafter ends the focus control processing.

Meanwhile, if the control unit 9 obtains a positive result in the determination at step SP75, the control unit 9 thereafter waits for an S-curve amplitude of the focus error signal to be detected (SP79). When an S-curve amplitude of the focus error signal is eventually detected, the control unit 9 increases the count value of the S-curve amplitude counter by 1 (SP80). Moreover, the control unit 9 thereafter performs focus lock-in to the recording layer (third recording layer 24 in this case) corresponding to the detected S-curve amplitude (SP81), and then ends the focus control processing.

In addition, if the control unit 9 obtains a positive result in the determination at step SP74, the control unit 9 thereafter waits for an S-curve amplitude of the focus error signal to be detected (SP82). When an S-curve amplitude of the focus error signal is eventually detected, the control unit 9 increases the count value of the S-curve amplitude counter by 1 (SP83).

Subsequently, the control unit 9 determines whether the count value of the S-curve amplitude counter has reached "5" (SP84), and returns to step SP82 upon obtaining a negative result. The control unit 9 thereafter repeats the loop of step SP81 to step SP84-step SP82.

When the control unit 9 obtains a positive result at step SP84 as a result of the count value of the S-curve amplitude counter eventually reaching "5", the control unit 9 performs focus lock-in to the recording layer (fourth recording layer 25 in this case) of the multilayered optical disk 2 corresponding to the detected S-curve amplitude of the focus error signal (SP85), and thereafter ends the focus control processing.

Meanwhile, to obtain a negative result in the determination at step SP72 means that the surface 21 of the multilayered optical disk 2 was not erroneously detected as a recording layer. Consequently, the control unit 9 determines that the current focal position of the objective lens 31 is on the third recording layer 24 (layer 1 of a four-layer disk) (SP86), and determines whether the target layer is the fourth recording layer 25 (layer 0 of a four-layer disk) (SP87).

If the control unit 9 obtains a negative result in the foregoing determination, the control unit 9 performs focus lock-in to the recording layer (third recording layer 24 in this case) of the multilayered optical disk 2 corresponding to the detected S-curve amplitude of the focus error signal (SP88), and determines whether the target layer is the third recording layer 24 (layer 1 of a four-layer disk) (SP89). The control unit 9 ends the focus control processing upon obtaining a positive result in the foregoing determination.

Moreover, if the control unit 9 obtains a negative result in the determination at step SP89, the control unit 9 moves the focal position of the objective lens 31 to the target layer by controlling the actuator 32 of the optical pickup 3 via the motor driver 7 (SP90), and thereafter ends the focus control processing.

Meanwhile, if the control unit 9 obtains a positive result in the determination at step SP87, the control unit 9 waits for an S-curve amplitude of the focus error signal to be detected subsequently (SP91). When the S-curve amplitude of the focus error signal is eventually detected, the control unit 9 increases the count value of the S-curve amplitude counter by 1 (SP92).

Moreover, the control unit 9 performs focus lock-in to the recording layer (fourth recording layer 25 in this case) corresponding to the detected S-curve amplitude of the focus error signal (SP93), and thereafter ends the focus control processing.

As described above, with the optical disk device 1 according to this embodiment, since the focal position of the objective lens 31 is determined without performing focus lock-in to the recording layer in which the third S-curve amplitude of the focus error signal was detected and focus lock-in is performed directly to the target layer, in addition to the effect that is yielded in the first embodiment, an additional effect of being able to position the focal position of the objective lens 31 on the target layer even more quickly can be obtained.

(3) Third Embodiment

Although the foregoing embodiments uses a three-layer or four-layer disk as the multilayered optical disk 2, a disk with five or more layers may also be used.

Here, the third embodiment of the focus control processing of the control unit 9 moving the focal position of the objective lens 31 to the target layer is now explained with reference to FIG. 10. However, in this embodiment, the multilayered optical disk 2 to be subject to the focus control processing is an M-layer multilayered optical disk of three or more layers.

Figure 10:
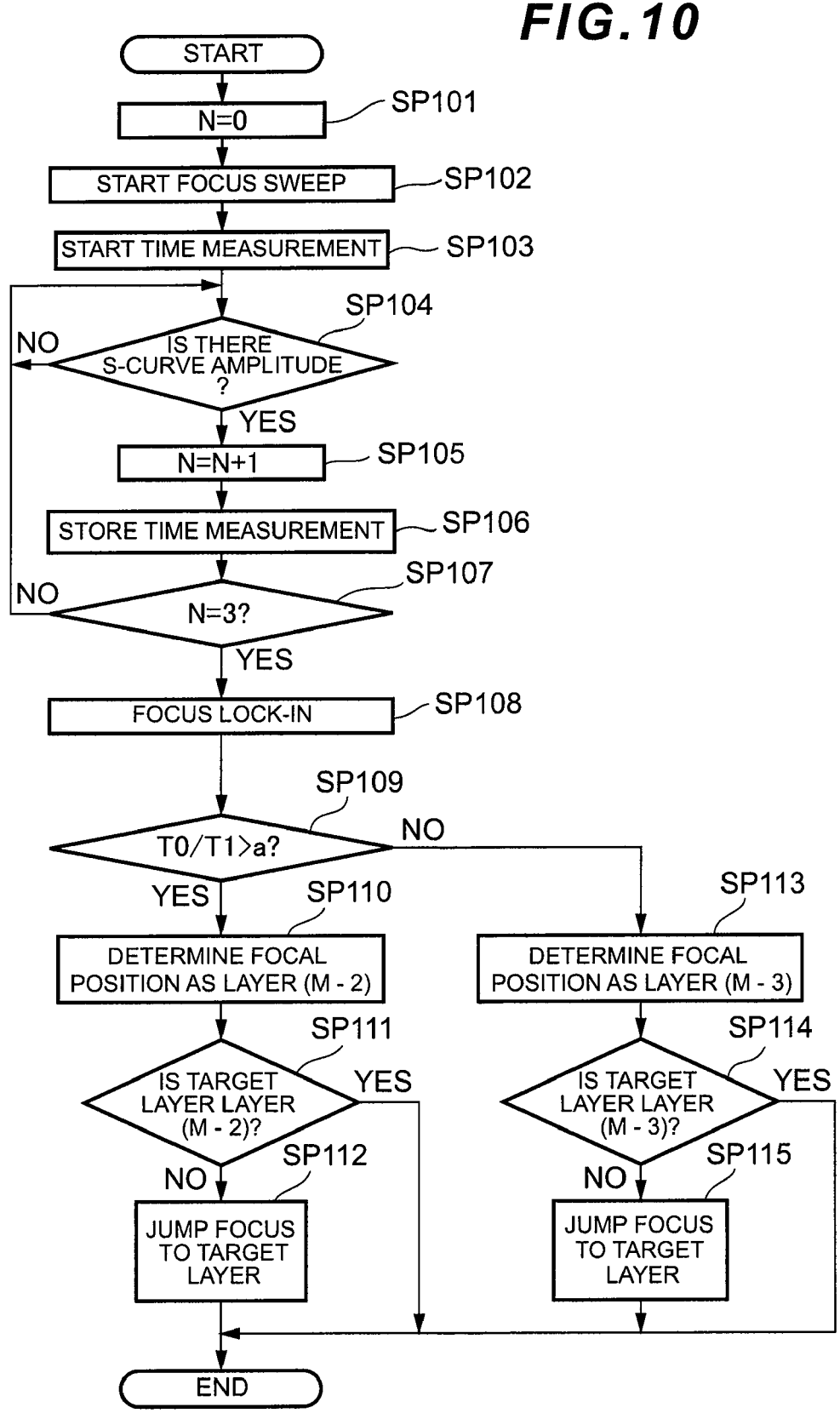
FIG. 10 is a flowchart showing the processing routine of the focus control processing according to the third embodiment.

Foremost, when the control unit 9 receives a command from the host computer 10 to move the focal position of the objective lens 31 to a specific recording layer (target layer), the control unit 9 starts the focus control processing shown in FIG. 10, and initializes the count value of the S-curve amplitude counter to "0" (SP101).

Subsequently, the control unit 9 starts the focus sweep by controlling the actuator 32 of the optical pickup 3 via the motor driver 7 (SP102), and starts measuring the time interval between the generation timings of the S-curve amplitudes based on the focus error signal supplied from the signal processing unit 6 (SP103).

The control unit 9 thereafter waits for an S-curve amplitude to be generated in the focus error signal (SP104), and, upon eventually detecting the S-curve amplitude, increases the count value of the S-curve amplitude counter by "1" (SP105).

Moreover, the control unit 9 stores the time interval from the previous detection of the S-curve amplitude of the focus error signal to the current detection of the S-curve amplitude of the focus error signal in the memory 91 (SP106). However, at the stage that the S-curve amplitude of the focus error signal was detected first, since the foregoing time interval cannot be obtained, the processing of storing the time interval in the memory 91 is not performed in the foregoing case.

Subsequently, the control unit 9 determines whether the count value of the S-curve amplitude counter has reached "3" (SP107). The control unit 9 returns to step SP104 upon obtaining a negative result in this determination, and thereafter repeats the loop of step SP104 to step SP107-step SP104 until a positive result is obtained at step SP107.

When the control unit 9 eventually obtains a positive result at step SP107 as a result of detecting the third S-curve amplitude of the focus error signal after starting the focus sweep at step SP102, the control unit 9 stops the focus sweep, and performs focus lock-in to the recording layer of the multilayered optical disk 2 corresponding to the S-curve amplitude of the focus error signal which was detected third (SP108).

In addition, the control unit 9 thereafter determines whether the numerical value obtained by dividing the time interval T0, which is the time interval from the detection of the first S-curve amplitude to the detection of the second S-curve amplitude regarding the focus error signal, by the time interval T1, which is the time interval from the detection of the second S-curve amplitude to the detection of the third S-curve amplitude regarding the focus error signal, is greater than the determination threshold "a" (SP109). Note that, at step SP109, it is also possible to determine whether the multiplication result obtained by multiplying the foregoing time interval T1 by the determination threshold "a" is greater than the foregoing time interval T0.

If the control unit 9 obtains a positive result in the foregoing determination, the control unit 9 determines that the current focal position of the objective lens 31 is on the layer (M-1) (SP110), and determines whether the target layer is the layer (M-2) (SP111). The control unit 9 ends the focus control processing upon obtaining a positive result in the foregoing determination.

Moreover, if the control unit 9 obtains a negative result in the determination at step SP111, the control unit 9 moves the focal position of the objective lens 31 to the target layer by controlling the actuator 32 of the optical pickup 3 via the motor driver 7 (SP112), and thereafter ends the focus control processing.

Meanwhile, if the control unit 9 obtains a negative result in the determination at step SP109, the control unit 9 determines that the current focal position of the objective lens 31 is on the layer (M-3) (SP113), and determines whether the target layer is the layer (M-3) (SP114). The control unit 9 ends the focus control processing upon obtaining a positive result in the foregoing determination.

Meanwhile, if the control unit 9 obtains a negative result in the determination at step SP114, the control unit 9 moves the focal position of the objective lens 31 to the target layer by controlling the actuator 32 of the optical pickup 3 via the motor driver 7 (SP115), and thereafter ends the focus control processing.

As described above, according to the focus control processing according to this embodiment, the focal position of the objective lens 31 can be positioned on the target layer with accuracy even with a multilayered optical disk 2 of five or more layers.

(4) Fourth Embodiment

The foregoing first to third embodiments determined whether the surface 21 (FIG. 3) of the multilayered optical disk 2 was erroneously detected as a recording layer based on the time interval of the S-curve amplitude of the focus error signal that is detected upon performing the focus sweep.

Nevertheless, in the case of performing a focus sweep, it is also possible to use the fact that the voltage value of the drive voltage to be applied to the actuator 32 for moving the objective lens 31 from the lower limit position of drive to the upper limit position of drive at a constant speed is gradually increased, and determine whether the surface 21 of the multilayered optical disk 2 was erroneously detected as a recording layer based on the foregoing drive voltage.

Figure 11:
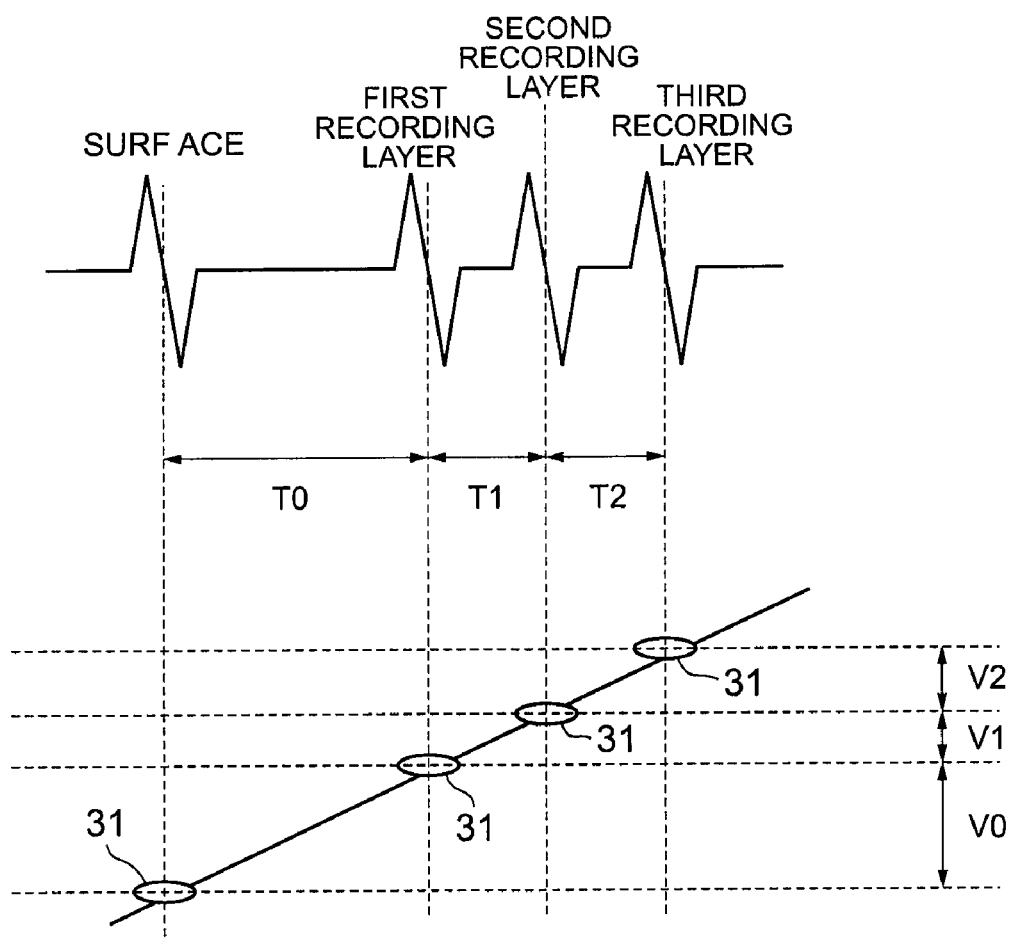
FIG. 11 is a conceptual diagram explaining the focus control processing according to the fourth embodiment.

In other words, as shown in FIG. 11, when moving the objective lens 31 from the lower limit position of drive to the upper limit position of drive at a constant speed, the potential difference V0 between the drive voltage of the actuator 32 upon focusing exacting on the surface 21 of the multilayered optical disk 2 and the drive voltage of the actuator 32 upon focusing exactly on the first recording layer 22 (FIG. 3) will become considerably greater in comparison to the potential difference V1 between the drive voltage of the actuator 32 upon focusing exactly on the first recording layer 22 and the drive voltage of the actuator 32 upon focusing exactly on the second recording layer 23 (FIG. 3) (potential difference V0>>potential difference V1).

Meanwhile, the potential difference V1 between the drive voltage of the actuator 32 upon focusing exactly on the first recording layer 22 and the drive voltage of the actuator 32 upon focusing exactly on the second recording layer 23 (FIG. 3) will be approximately equal to the potential difference V2 between the drive voltage of the actuator 32 upon focusing exactly on the second recording layer 23 and the drive voltage of the actuator 32 upon focusing exactly on the third recording layer 24 (FIG. 3) (potential difference V1≈potential difference V2).

Accordingly, if the differential voltage between the voltage value of the drive voltage of the actuator 32 upon the first exact focus and the voltage value of the drive voltage of the actuator 32 upon the second exact focus after starting the focus sweep is considerably greater than the differential voltage between the voltage value of the drive voltage of the actuator 32 upon the second exact focus and the voltage value of the drive voltage of the actuator 32 upon the third exact focus, it is possible to determine that the surface 21 of the multilayered optical disk 2 is being erroneously detected as a recording layer.

As a specific method for determining whether the surface 21 of the multilayered optical disk 2 is being erroneously detected as a recording layer employing the foregoing scheme, for example, in the optical disk device 1 of FIG. 1, a the timing that the signal processing unit 6 detects the center point of the S-curve amplitude of the focus error signal after starting the focus sweep (timing that the signal level of the S-curve amplitude becomes 0), this is sequentially notified to the control unit 9, and the control unit 9 sequentially stores the voltage value of the drive voltage of the actuator 32 at such time. Subsequently, the control unit 9 compares the potential difference between the voltage value that was stored first and the voltage value that was stored second and the potential difference between the voltage value that was stored second and the voltage value that was stored third, and determines whether the surface 21 of the multilayered optical disk 2 was erroneously detected as a recording layer based on the foregoing comparative result.

Moreover, the processing routine of the control unit 9 in the foregoing case is the same as the processing routine explained with reference to FIG. 6 to FIG. 10. More specifically, for example, in the case of FIG. 6, the processing of step SP3 is no longer required, and the voltage value of the drive voltage of the actuator 32 at such time is stored at step SP6, and whether the product obtained by dividing the potential difference of the voltage value that was stored first and the voltage value that was stored second by the potential difference of the voltage value that was stored second and the voltage value that was stored third is greater than a predetermined threshold is thereafter determined at step SP10 or step SP17. The same applies to the case of FIG. 7 to FIG. 9 and the case of FIG. 10.

According to the foregoing focus control method, the same effect as the first to third embodiments can be obtained.

(5) Other Embodiments

Note that, although the foregoing first to fourth embodiments did not designate the area for performing the focus control, the focus control may be performed in the BCA (Burst Cutting Area) area. Consequently, even with a multilayered optical disk 2 in which a recording layer recorded with data and a recording layer not recorded with data coexist, the focal position of the objective lens 31 can be moved to the target layer with accuracy.

Specifically, with a recording layer recorded with data, the S-curve amplitude of the FE signal is small, and, with a recording layer not recorded with data, the S-curve amplitude is large. Thus, if a recorded layer and a non-recorded layer coexist, it is necessary to set a threshold for detecting the S-curve amplitude to both layers. In the foregoing case, if the threshold is set to match the layer with a smaller S-curve amplitude, there is a possibility that noise components will be detected with a larger S-curve amplitude, and the method of deciding the threshold becomes difficult. Thus, as a result of performing the focus control to the BCA area which is constantly non-recorded, it is possible to reduce the amplitude difference of the foregoing S-curve amplitudes, and the threshold for detecting the S-curve amplitude can be obtained easier. Moreover, consequently, it is also possible to improve the accuracy of detecting the S-curve amplitude during the focus control.

Moreover, although the foregoing first to fourth embodiments explained a case where the multilayered optical disk 2 is a BD, the present invention is not limited thereto, and the present invention may also be applied to optical disk devices corresponding to CDs, DVDs and other multilayered optical disks.

In addition, although the foregoing third embodiment explained a case where, as with the first embodiment, performing focus lock-in to the recording layer in which the third S-curve amplitude of the focus error signal was detected, and thereafter jumping the focus to the target layer as needed, the present invention is not limited thereto, and, for example, as with the second embodiment, it is also possible to determine the focal position of the objective lens 31 without performing focus lock-in to the recording layer in which the third S-curve amplitude of the focus error signal was detected, and perform focus lock-in directly to the target layer.

The present invention can be applied to optical disk devices corresponding to multilayered optical disks compliant with the BD standard, DVD standard, CD standard and other standards.

What is claimed is:

1. An optical disk device capable of reproducing an optical disk having three or more recording layers, comprising:
a laser diode for emitting a laser beam;
a photodiode for receiving light of the laser beam reflected from the optical disk, and outputting a signal based on the received reflected light upon performing photoelectric conversion thereto;
an optical system including an objective lens and which collects the laser beam emitted from the laser diode on the recording layer of the optical disk via the objective lens, and guides the reflected light from the optical disk to the photodiode via the objective lens;
a signal processing unit for creating a focus error signal based on an output of the photodiode;
a processor for detecting the recording layer based on the focus error signal created with the signal processing unit; and
an actuator for moving the objective lens of the optical system in a thickness direction of the optical disk,
wherein the processor:
moves the objective lens in the thickness direction of the optical disk by controlling the actuator, and measures a time interval in which each of the recording layers was detected while moving the objective lens,
compares a first time interval from the first detection of recording layer to the second detection of recording layer, and a second time interval from second detection of the recording layer to the third detection of recording layer,
determines a focal position of the objective lens based on a comparative result,
determines that a surface of the optical disk was erroneously detected as the recording layer if the first time interval is greater than the second time interval by a predetermined multiple that is greater than 1,
determines the focal position of the current focal position of the objective lens based on the determination result and the number of recording layers, and
moves the focal position of the objective lens on the recording layer that was detected third in the optical disk, and thereafter moves the focal position of the objective lens to the intended recording layer.

2. The optical disk device according to claim 1,
wherein the processor compares the first time interval and the second time interval while moving the objective lens.

3. The optical disk device according to claim 1,
wherein the processor determines the focal position of the objective lens based on the number of detected S-curve amplitudes if the first time interval is smaller than the second time interval by a predetermined multiple that is greater than 1.

4. The optical disk device according to claim 1,
wherein the processor measures the time interval of detecting the recording layers in a burst cutting area.

* * * * *